United States Patent
Peterson et al.

(10) Patent No.: US 8,403,021 B1
(45) Date of Patent: Mar. 26, 2013

(54) PORTABLE PARTITION SYSTEM HAVING MODULAR FRAMES, BARS, AND FRICTION FIT SPACERS

(76) Inventors: Julie M. Peterson, Maple Lake, MN (US); Brendan J. Mooney, Saint Cloud, MN (US)

( * ) Notice: Subject to any disclaimer, the term of this patent is extended or adjusted under 35 U.S.C. 154(b) by 9 days.

(21) Appl. No.: 13/038,379

(22) Filed: Mar. 1, 2011

Related U.S. Application Data

(63) Continuation-in-part of application No. 12/605,282, filed on Oct. 23, 2009, now Pat. No. 8,082,971.

(60) Provisional application No. 61/314,138, filed on Mar. 15, 2010, provisional application No. 61/197,447, filed on Oct. 28, 2008.

(51) Int. Cl.
*A47G 5/00* (2006.01)

(52) U.S. Cl. ........................................ 160/135; 160/391

(58) Field of Classification Search ................. 160/135, 160/351, 352, 234, 391–395; 52/239; 40/605, 40/606.16
See application file for complete search history.

(56) References Cited

U.S. PATENT DOCUMENTS

| | | | |
|---|---|---|---|
| 381,342 A | 4/1888 | De Land | |
| 846,531 A | 3/1907 | Viets | |
| 1,080,317 A | 12/1913 | Beckwith | |
| 1,093,119 A | 4/1914 | Donavan | |
| 2,012,385 A | 8/1935 | Gearing | |
| 2,145,030 A | 1/1939 | Press | |
| 2,268,669 A | 1/1942 | Moore | |
| 2,573,156 A | 10/1951 | Meyer | |
| 3,037,593 A | 6/1962 | Webster | |
| 3,224,489 A | 12/1965 | Haberthier | |
| 3,370,389 A | 2/1968 | Macaluso | |
| 3,463,218 A * | 8/1969 | Byrens et al. | 160/135 |
| 3,477,492 A | 11/1969 | Suess | |
| 3,509,673 A | 5/1970 | Witkosky et al. | |
| 3,592,289 A | 7/1971 | Aysta et al. | |
| 4,118,903 A | 10/1978 | Coulthard | |
| 4,194,313 A * | 3/1980 | Downing | 40/610 |
| 4,228,842 A * | 10/1980 | Clark | 160/234 |
| 4,467,854 A | 8/1984 | Godfrey | |
| 4,830,080 A | 5/1989 | Densen | |
| 4,876,835 A | 10/1989 | Kelley et al. | |
| 4,879,854 A | 11/1989 | Handler | |
| 4,977,696 A | 12/1990 | Johansson | |
| 5,038,539 A | 8/1991 | Kelley et al. | |
| 5,046,546 A * | 9/1991 | Benedyk et al. | 160/371 |
| 5,088,250 A | 2/1992 | DeLong et al. | |
| 5,143,138 A | 9/1992 | Zwart | |
| 5,172,504 A | 12/1992 | De Maat et al. | |

(Continued)

OTHER PUBLICATIONS

"Wood Shoe Racks, Book Shelves—Home & Office Organizing", HTTP;//www.shelfexpressions.com/additionalshelving.htm, Shelf Expressions, Oct. 16, 2009, 2 pages.

(Continued)

*Primary Examiner* — David Purol
(74) *Attorney, Agent, or Firm* — Albert W. Watkins

(57) ABSTRACT

A portable partition system for dividing spaces and which can easily be changed in appearance, function and size has at least one frame that includes interior grooves suitable for receiving rigid or flaccid panels. More frames may be connected with lift-off or removable pin hinge sections, which allows a user to add to or remove rigid rectangular frames from the system simply. Dowels may suspend fabric panels, or rigid flat panels may be slid down through an opening at the top of and into each frame along with removable bars to create a structure notably different in appearance or purpose. All of the components, including dowels, fabric panels, flat panels, and horizontal bars, are insertable into the rigid rectangular frames and are removable, reversible and replaceable at will, generally without tools, to achieve many different visual effects using the same set of frames.

18 Claims, 12 Drawing Sheets

U.S. PATENT DOCUMENTS

| | | | |
|---|---|---|---|
| 5,291,700 | A | 3/1994 | Chew |
| 5,368,085 | A * | 11/1994 | Ruparelia ..................... 160/327 |
| D357,175 | S | 4/1995 | Godfrey |
| 5,448,863 | A | 9/1995 | Zapf |
| 5,450,694 | A | 9/1995 | Goranson et al. |
| 5,560,413 | A * | 10/1996 | Brown ......................... 160/135 |
| 5,626,926 | A | 5/1997 | Roberts |
| D393,951 | S | 5/1998 | Ravenscroft |
| 5,803,146 | A | 9/1998 | Boon |
| 5,875,596 | A | 3/1999 | Muller |
| 6,598,649 | B1 | 7/2003 | Moore et al. |
| 6,945,305 | B1 * | 9/2005 | Limauro ....................... 160/369 |
| 7,387,151 | B1 | 6/2008 | Payne |

OTHER PUBLICATIONS

"Pop Up Exhibits, Sign Frames, Stands, Custom Si . . . ", http://www.godfreygroup.com/banner-stands-and-sign-displays/banner-stands-and-small-displays-5.php, The Godfrey Group, Dec. 10, 2007, 5 pages.

\* cited by examiner

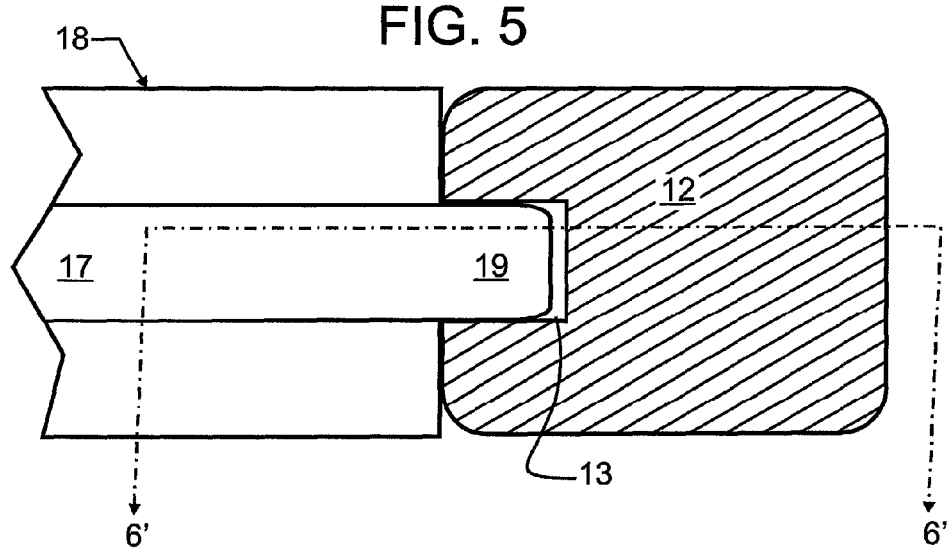
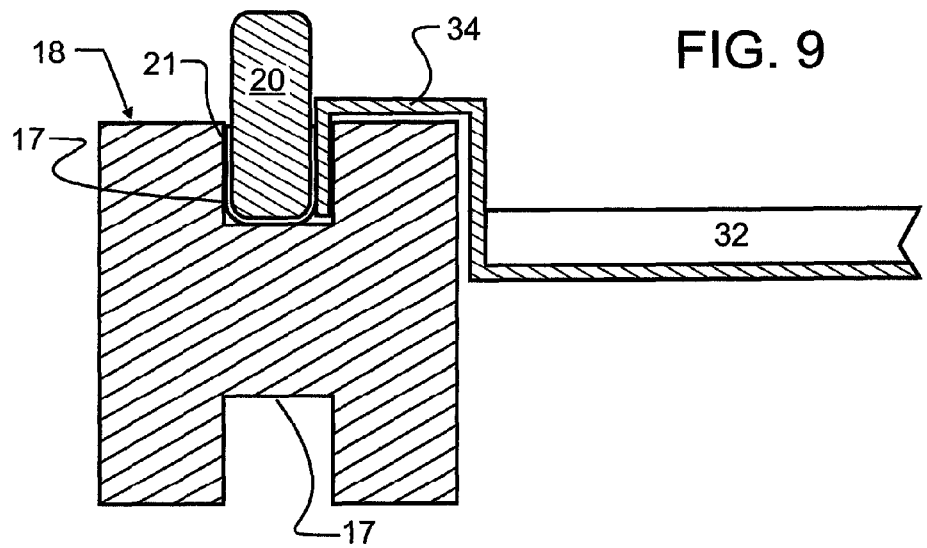

0
PORTABLE PARTITION SYSTEM HAVING MODULAR FRAMES, BARS, AND FRICTION FIT SPACERS

CROSS REFERENCE TO RELATED APPLICATIONS

This application claims priority to U.S. provisional patent application 61/314,138, filed Mar. 15, 2010 and naming the present inventors, the contents which are incorporated herein by reference in entirety, and is additionally a continuation-in-part of U.S. patent application Ser. No. 12/605,282, filed Oct. 23, 2009 now U.S. Pat. No. 8,082,971 and naming the present inventors, the contents which are incorporated herein by reference in entirety, which in turn claims priority to U.S. provisional patent application 61/197,447 filed Oct. 28, 2008 and naming the present inventors, the contents which are incorporated herein by reference in entirety.

BACKGROUND OF THE INVENTION

1. Field of the Invention

This invention pertains generally to portable partitions, and more particularly to such partitions intended for use in decorating and design. In one manifestation, the invention pertains to lightweight, modular, partitions which are comprised of one or more smaller units with interchangeable components.

2. Description of the Related Art

Portable partitions can present enormous versatility in designing for both decorative and utilitarian function. As is well understood in the field of design, structural components such as walls, windows, doorways and the like are not easily altered. Quite simply, it is very arduous, messy and expensive to move a structure such as a wall. Furthermore, structural components are relatively limited in terms of customization options. The surface finish may be changed, and small or lightweight items may be adhered to the surface, such as stencils, photographs, posters or the like. However, even changing the surface finish is relatively disruptive, requiring the application of paint, paneling, or the like. These changes often require or may quite preferably be performed by a skilled service provider such as a carpenter or painter, and also still require significant time. As a result, most occupants rarely will undertake making any substantive decorative changes to the structural aspects of a static space.

Rather than alter the static components, alternatives have been developed that permit more ready changes to an occupied space. For exemplary purposes, some of these alternatives are illustrated in the following U.S. patents, the contents and teachings of each which are incorporated herein by reference: U.S. Pat. No. 381,342 by De Land, entitled "Bulletin board"; U.S. Pat. No. 1,080,317 by Beckwith, entitled "Display sign holder"; U.S. Pat. No. 1,093,119 by Donavan, entitled "Collapsible screen and rack"; U.S. Pat. No. 2,012,385 by Gearing, entitled "Interchangeable panel sign"; U.S. Pat. No. 2,573,156 by Meyer, entitled "Screen with removable panel"; U.S. Pat. No. 3,509,673 by Witkosky et al, entitled "Modular partition wall system"; U.S. Pat. No. 3,592,289 by Aysta et al, entitled "Freestanding acoustical space divider"; U.S. Pat. No. 4,467,854 by Godfrey, entitled "Connector for display systems"; U.S. Pat. No. 4,876,835 by Kelley et al, entitled "Work space management system"; U.S. Pat. No. 4,977,696 by Johansson, entitled "Display rack"; U.S. Pat. No. 5,038,539 by Kelley et al, entitled "Work space management system"; U.S. Pat. No. 5,143,138 by Zwart, entitled "Screen molding"; U.S. Pat. No. 5,448,863 by Zapf, entitled "Covered wall unit and method of making same"; U.S. Pat. No. 7,387,151 by Payne, entitled "Cabinet door with changeable decorative panel"; Des 357,175 by Godfrey, entitled "Connector for display stands"; and Des 393,951 by Ravenscroft, entitled "Household screen".

The more relevant of these foregoing alternatives are often referred to as screens, panels, or partitions, each of which for the purposes of the present disclosure will be simply referred to and understood herein to be partitions. These more relevant patents are exemplary of, illustrate and describe a wide variety of partitions that can readily be used to divide a larger space, display personal objects, and readily alter a building space. Some of these provide apparatus which can be used to accomplish this with limited use of or completely without the use of tools. As a result, partitions have become very commonplace in larger occupied spaces where it is desirable to preserve the space for alternative uses, while subdividing flexibility. For exemplary purposes only, and certainly not limited thereto, partitions are found in studio apartments or rooms where they are used to divide the living space, businesses where workers are divided into individual working areas or cubicles, for displays of personal or business information, in dining establishments forming smaller and more cozy spaces while preserving a larger structural space for much large special events and gatherings, and for many, many other applications.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a portable partition system which is readily adaptable in appearance and function. A first longitudinally extensive upright has a longitudinally extensive groove therein. A second longitudinally extensive upright has a longitudinally extensive groove therein. The first and second uprights are spaced from each other and oriented with the second upright groove facing the first upright groove and defining a panel space therebetween into which a decorative panel may be operatively inserted. A first spacer is at least partially inserted within and manually removable from the first upright groove. A second spacer is at least partially inserted within and manually removable from the second upright groove. A support bar spans from the first upright to the second upright and is manually removable therefrom, supported vertically by the first and second spacers.

In a second manifestation, the invention is a partition system. A first longitudinally extensive upright has a longitudinally extensive groove therein. A second longitudinally extensive upright has a longitudinally extensive groove therein. The first and second uprights are spaced from each other and oriented with the second upright groove facing the first upright groove and defining a panel space therebetween into which a decorative panel may be operatively inserted. A first spacer is at least partially inserted within and manually removable from the first upright groove. A second spacer is at least partially inserted within and manually removable from the second upright groove. A first support bar spans from the first upright to the second upright and is manually removable therefrom, supported vertically by the first and second spacers, and has at least one longitudinally extensive groove that cooperates with the first upright groove and second upright groove to receive a rigid generally rectangular panel therein. A third longitudinally extensive upright has a longitudinally extensive groove therein. A fourth longitudinally extensive upright has a longitudinally extensive groove therein, the third and fourth uprights spaced from each other and oriented with the fourth upright groove facing the third upright groove and defining a panel space therebetween into which a decorative panel may be operatively inserted. A third spacer is at least partially inserted within and manually removable from the third upright groove. A fourth spacer is at least partially inserted within and manually removable from the fourth upright groove. A second support bar longitudinally extends from the third upright to fourth upright and is manually removable therefrom, supported vertically by the third and fourth spacers, and has at least one longitudinally extensive groove that cooperates with the third upright groove and fourth upright groove to receive a rigid generally rectangular panel therein. A hinge pivotally couples the third upright to first upright. A shelf engages and is supported within the first and second support bar grooves.

OBJECTS OF THE INVENTION

Exemplary embodiments of the present invention solve inadequacies of the prior art by providing rigid modular frames having bars and friction fit spacers that allow the frames to support and display very diverse articles at readily altered heights and positions. The articles, which may include fabric panels, flat panels, shelving, are removable, reversible and replaceable in a matter of a few seconds in a simple and intuitively obvious manner. The result is a portable divider that can easily be changed in appearance, function and size by most anyone, without the use of tools, and which can incorporate a much wider variety of displays than heretofore reasonably possible.

A first object of the invention is to provide a portable and modular partition which may be transported and placed or located easily and at will. A second object of the invention is to enable customization of the partitions, primarily or entirely without the use of tools, through very simple mechanical actions which are intuitive. Another object of the present invention is to accommodate many diverse articles that may be used for function, display or to otherwise alter the appearance or function of a space. A further object of the invention is to achieve the foregoing objectives in an easily manufactured, relatively low cost and durable construction. Yet another object of the present invention is to provide a stable and secure method for both anchoring and expanding the partitions, where required.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 5 illustrates the preferred engagement of the support bars with the frame from an exploded cross-section view taken along section line 5' of FIG. 1.

FIGS. 8 and 9 illustrate the preferred embodiment shelf of FIG. 7 in a most preferred further combination with the preferred embodiment of FIG. 1 from top plan and cross-section views, respectively.

FIG. 10 illustrates a pair of shelving brackets extending in two opposed directions, while sharing a common support, and with sufficient space therebetween to slide a panel in.

DESCRIPTION OF THE PREFERRED EMBODIMENT

Figure 1:
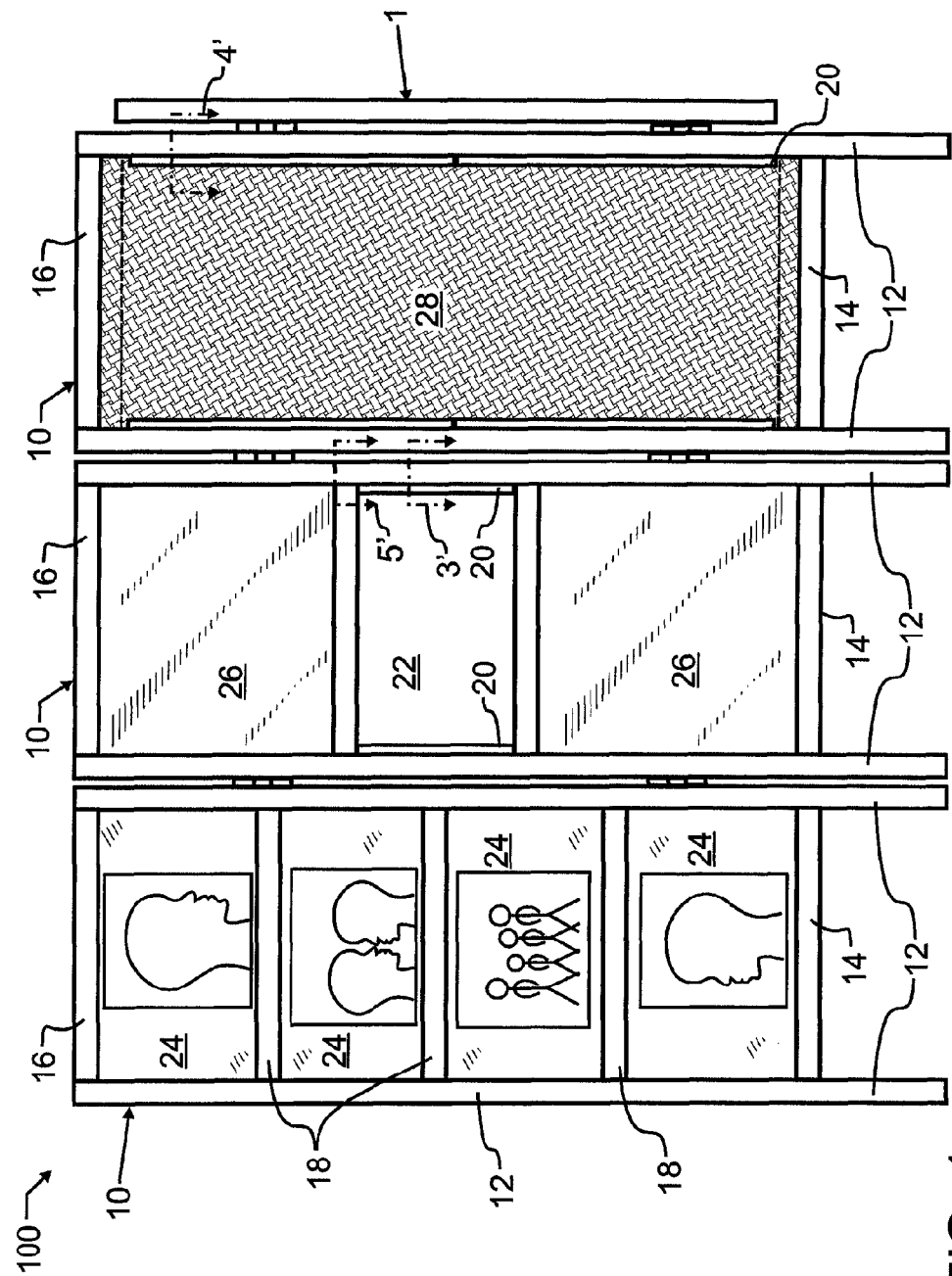
FIGS. 1 and 2 illustrate a preferred embodiment designed in accord with the teachings of the invention from front and top plan view, respectively.

Manifested in the preferred embodiment, the present invention provides a portable partition system 100 comprised of interchangeable panels 22, 24, 26, 28, modular frames 10, support bars 18, and friction fit spacers 20. In a preferred embodiment of the invention illustrated in FIGS. 1 and 2, the modular frames 10 have two removable pin hinge sections on each edge to be connected. When interconnected, these removable pin hinge sections form a removable pin hinge 9 similar to that found on nearly all interior household doors. These removable pin hinges 9 allow modular frames 10 to be added to or removed easily from portable partition system 100 without the use of tools. Such a method allows one to readily increase or decrease the width of system 100 as needed or desired. Each modular frame 10 provides the basic structure and determines the height of the completed structure. Each modular frame 10 is preferably sturdy and in the preferred embodiment non-collapsible, even when no panels or removable horizontal bars are inserted. Those skilled in the art will recognize that there may be applications where modular frames 10 will instead be collapsible, and that such may readily be achieved with any of the variety of known fasteners upon a review of the present disclosure, but that a collapsible frame then includes more complexity and cost which is less preferred herein. When the various components are added, portable partition system 100 is sturdy and portable.

Figure 2:
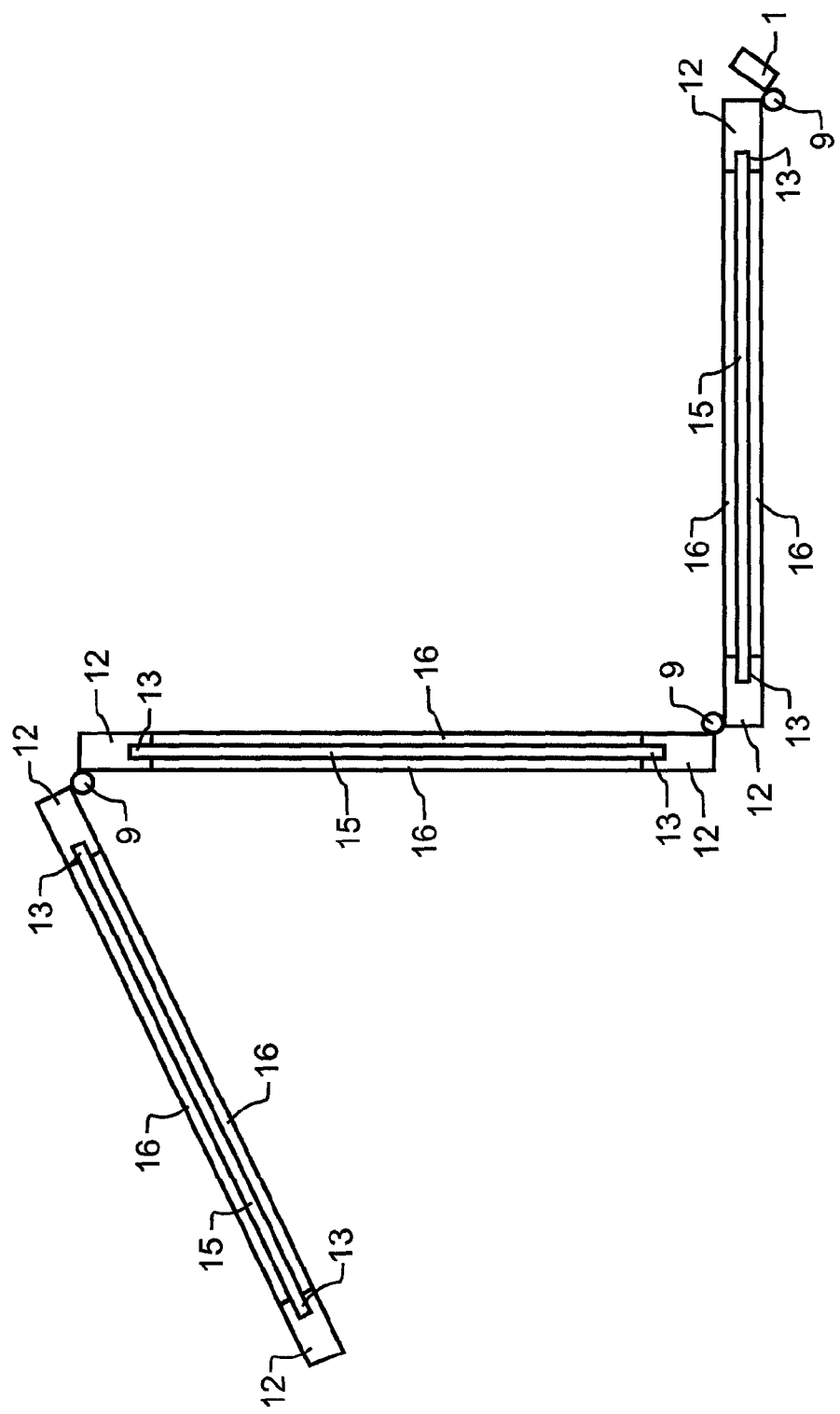

Modular frames 10 may be used individually, alternatively arranged at angles to create a freestanding partition or display area such as illustrated by FIG. 2, or, when interconnected, pulled open to be arranged co-planarly along a line. When arranged in co-planar fashion, portable partition system 100 will preferably be fastened at one end to a wall or other unmovable structure to keep portable partition system 100 from falling over. Most preferably, wall mount 1 is connected with two hinges 9 as well, allowing for portable partition system 100 to be removed from the wall and moved into storage when not in use. In the preferred embodiment of the invention, wall mount 1 is semi-permanently adhered to a wall using fasteners such as, but not limited to, screws, nails or adhesives. Where hardware such as screws or nails are used, matching caps can cover and conceal the fasteners.

Additionally, as illustrated in FIGS. 1 and 2, removable pin hinges 9 can be on alternating sides or all on the same side. Alternating sides allows for a zig-zag pattern, whereas having the removable pin hinges 9 on one side allows for readily creating a circular area within a room, which can be desirable when creating a work space or otherwise breaking up a room.

FIGS. 1 and 2 further illustrate that there is a continuous, straight, longitudinal groove 13 along the inside of each upright 12, and a corresponding groove along the inside (top) of the crossbar 14 at the bottom of the modular frame 10. At the top of the modular frame 10 are two horizontal bars 16 that are parallel to each other with an open space 15 between them to allow the insertion of generally planar webs, or panels including flaccid, semi-flexible, or rigid material into the grooves 13 of frame 10 by sliding the interchangeable panels 24, 26, 28 through opening or space 15 at the top. The user may choose from a variety of interchangeable panels to insert, differing in height, decorative appearance or function, allowing the user to determine the appearance and function of the partition. Panels 24, 26, 28 may be separated by removable support bars 18, allowing for various indeterminate height panels to be used. Preferred embodiment support bars 18 have grooves 17 running across the top and bottom of the bar, to securely hold the top or bottom edge of an inserted panel. The support bars 18 also have tenons 19 at each end which are inserted into the vertical grooves 13 in both interior sides of the modular frame 10. For exemplary purposes only, and not limiting thereto, a user will place support bar 18 by inserting a tenon 19 at one end of support bar 18 into a groove 13, holding the support bar 18 at an angle. The user then applies downward pressure to the end angled upward, lining the opposing tenon 19 up with the opposing groove 13, thereby placing the support bar 18 horizontally in the modular frame 10. The support bar 18 can be slid up or down while held in the grooves 13. If the panels are rigid and sufficiently thick, they will hold support bar 18 at a fixed vertical position. However, modular frames 10 also can hold less rigid or much thinner interchangeable panels 28, such as fabric, posters, pictures, paper, mesh, screen or other similar materials. In such instances, a user simply inserts friction fit spacers 20 in combination with flaccid panels 28 into vertical grooves 13 and the horizontal grooves in support bars 18 and/or crossbars 14, 16. The friction fit spacers 20 will thereby hold the less rigid interchangeable panels 28 in place, providing a reasonably taut panel, while providing a spacer for support bars 18. If desired, a user may also start by wrapping the flexible or flaccid panel material 28 about a dowel, stick or other member, which may then extend between grooves 13 similar to support bars 18. In such instance, only vertically oriented friction fit spacers 20 are required, such as illustrated in FIG. 1. Better understanding of the wrapping of a flaccid or flexible panel about a dowel, rod or other rigid member may be obtained from the Payne, Donovan, Meyer and other patents incorporated by reference herein above. Similarly, one may choose to use friction fit spacers 20 in combination with support bars 18 to create an open panel 22, as illustrated in FIG. 1.

Figure 3:
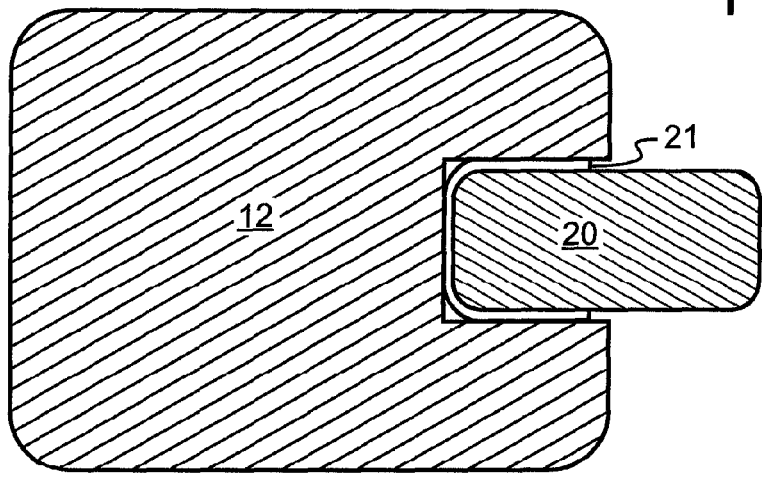
FIGS. 3 and 4 illustrate the preferred engagement of preferred friction fit spacers with the frame without and with a flexible and thin panel, respectively from a cross-section view taken along section line 3' of FIG. 1 for FIG. 3, and section line 4' of FIG. 1 for FIG. 4.
Figure 4:
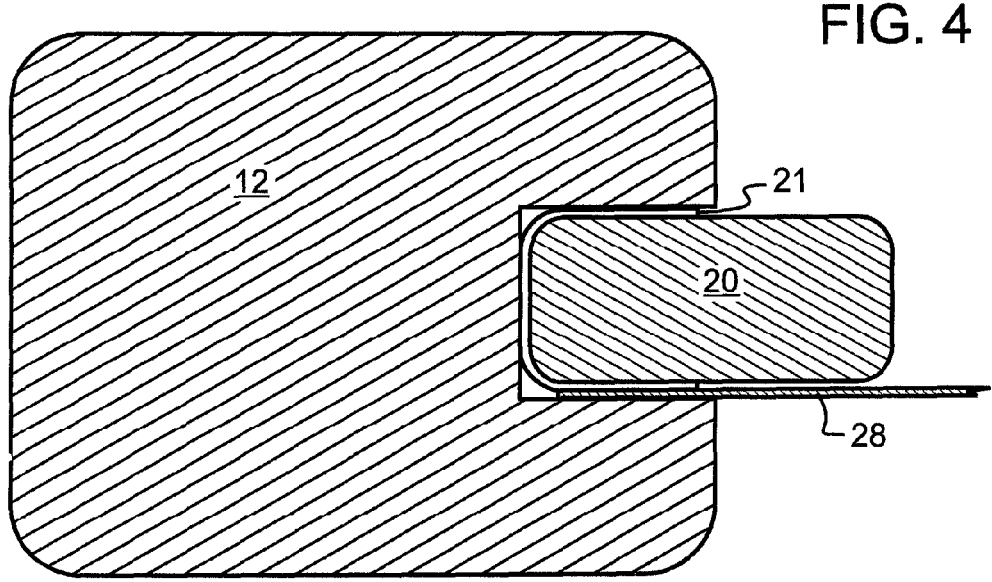
Figure 20:
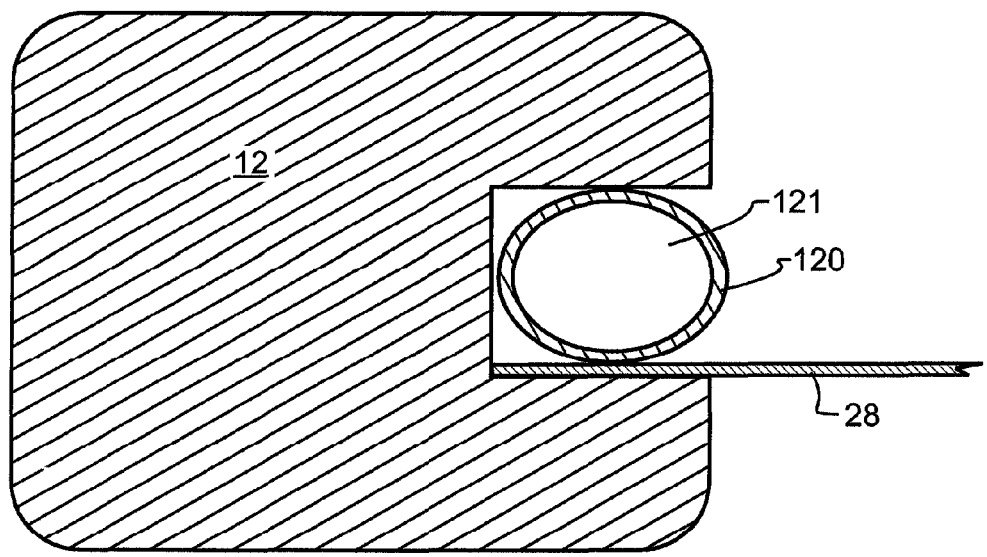
FIG. 20 illustrates an alternative friction fit spacer with the frame from a sectional view from a cross-section view similar to section line 4' of FIG. 1.

FIGS. 3 and 4 illustrate in more detail the preferred connection between friction fit spacers 20 and uprights 12. As can be seen, friction fit spacers 20 slide into the groove 13 with a small space remaining. In the case of an open panel 22, friction fit spacers 20 may preferably be provided with a small patch of material 21 which provides the remaining amount of friction necessary to hold the spacers 20 in place. However, adding the less rigid interchangeable panels 28 would be sufficient to do so as well, which requires a sufficiently small and resilient patch of material such that it does not interfere with use in combination with less rigid interchangeable panels 28. In the preferred embodiment, patch 21 is fabricated from the fabric or loop portion of commercial hook-and-loop material such as is sold under the well-known trademark Velcro, though a variety of other materials may be recognized as suitable as well. This loop material offers several benefits that may not be apparent at first blush, including resilience, a composition and construction which tends not to damage relatively delicate fabrics that might be used as panels 28, and since the individual loops may individually compress, a relative ease with which the patch 21 may be inserted and withdrawn from within a groove compared to contiguous materials such as foams or rubbers. In one conceived alternative illustrated herein in FIG. 20, friction fit spacers 120 might be hollow or be comprised of a lower density compressible core 121, and might further be oval. Such geometry permits friction fit spacers 120 to retain the desirable, and, in some designs, necessary vertical strength, while enabling friction fit spacers 120 to accommodate and secure a wider range of thicknesses of panels than achieved with friction fit spacers 20. Noteworthy here is the fact that spacers 20, 120 are captured on three sides by the walls of grooves 13, 15, 17. Consequently, spacers 20, 120 do not need to have great rigidity, and may flex easily relative to their longitudinal axis. As long as they are not easily longitudinally compressed, they will likely perform the desired vertical support function. As an analogy, a straw flexes easily relative to the longitudinal axis. However, if a straw were inserted into a pipe having an inside diameter equal to the outside diameter of the straw, the straw would support very large longitudinally compressive forces.

In yet another alternative, magnets may be provided within the various support grooves such as groove 17, and spacers 20 might then be fabricated from ferromagnetic materials or even magnetic materials, and so may be retained magnetically, rather than through frictional forces. In a further alternative embodiment, spacers 20 might be flocked, which is understood to indicated an almost felt or velvet surface that is commonly produced by applying or spraying fibers onto a tacky painted surface. Friction fit spacers 20, 120 might also be pre-scored and/or fabricated from sufficiently brittle materials to permit them to be manually severed or snapped apart to desired lengths.

Figure 6:
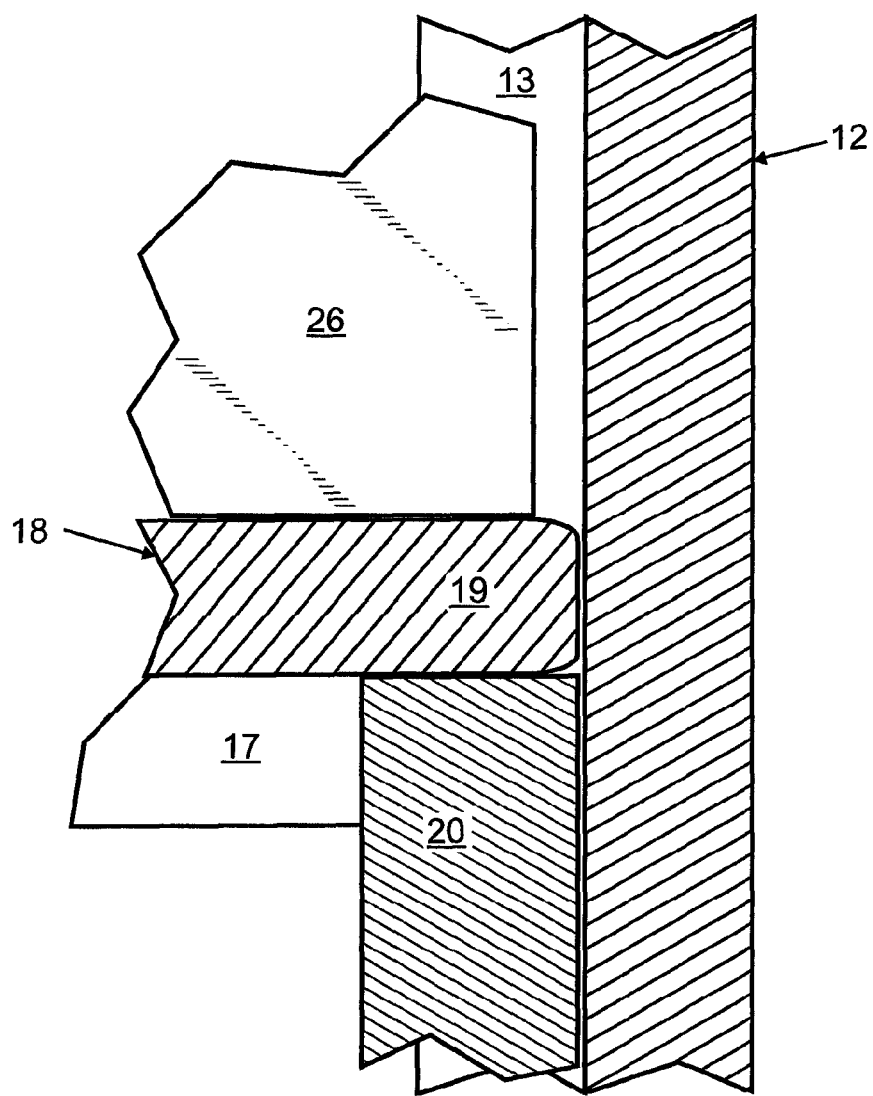
FIG. 6 illustrates the preferred engagement of FIG. 5 from a further cross-section view taken along section line 5', illustrating a support bar, frame member, thin panel, and friction fit spacer.

FIGS. 5 and 6 illustrates the combination of a support bar 18 with upright 12. As can be seen, in the preferred embodiment, tenon 19 may be designed to span the distance between top and bottom grooves 17, and extends therefrom for engagement with groove 13. Similar to friction fit spacers 20, tenon 19 is sized to form a reasonably secure engagement with groove 13. As can be further seen, friction fit spacers 20 and rigid interchangeable panels 24, 26 each may preferably be designed to be capable of engaging with groove 17 of support bars 18 in such a manner that they are sufficiently framed by support bars 18.

Figure 7:
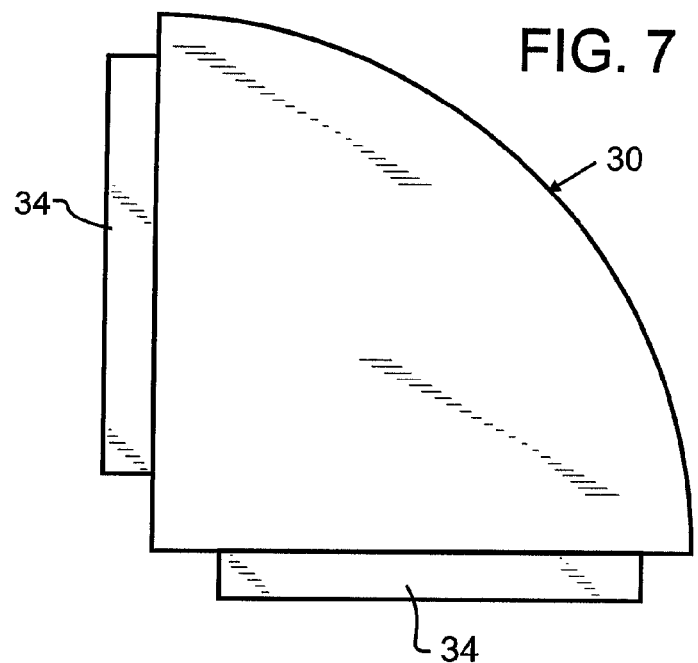
FIG. 7 illustrates a preferred embodiment shelf from top plan view.

FIG. 7 illustrates a preferred shelf 30 that may be used in combination with portable partition system 100. Preferred embodiment shelf 30 is designed for use with portable partition system 100 when modular frames 10 may be held at a predetermined angle to one another. The predetermined angle may vary, allowing for a variety of corners for the shelf 30. For example, as illustrated in the figures shelf 30 spans a quarter circle, or through a ninety-degree arc. The actual extent of arc may be chosen by a designer at the time of construction of the shelf, is not limited to ninety degrees, and may arc through more or less than ninety degrees as may be desired by the designer. Most preferably, shelf 30 has a thin hook 34 defining two radially extending edges. Hooks or brackets 34 may be formed unitarily or integrally with shelf 30, or may be removable, such as for exemplary purposes being fabricated separately from and subsequently affixed to shelves 30 with screws or other fasteners. Hooks 34 form a preferred angle for interaction with and coupling to crossbars 14, 16 and/or support bars 18. The outer, circumferential edge of shelf 30 is defined by a lip 32 that is most preferably rounded, though it could take on a number of geometries as determined at the time of design to be aesthetically and functionally pleasing, and is not to be limited to one or another geometry. Additionally, shelf 30 while shown as solid may alternatively be porous, transparent, or take on any other characteristics that a designer wishes to impart therein. While shelf 30 is illustrated as defining a quarter circle in FIGS. 7 and 8, it will immediately be recognized that shelves may be square, rectangular or of other geometry from the top view of FIGS. 7 and 8, and will have appropriate hooks or brackets 34. In other words there may be two, three or four brackets extending from the edges of square or rectangular shelves 30, while quarter-circle shelves such as illustrated will have only two hooks 34. Furthermore, shelves of different geometries may be incorporated into a single portable partition system 100, such as illustrate for exemplary purpose in FIG. 13 herein.

Figure 8:
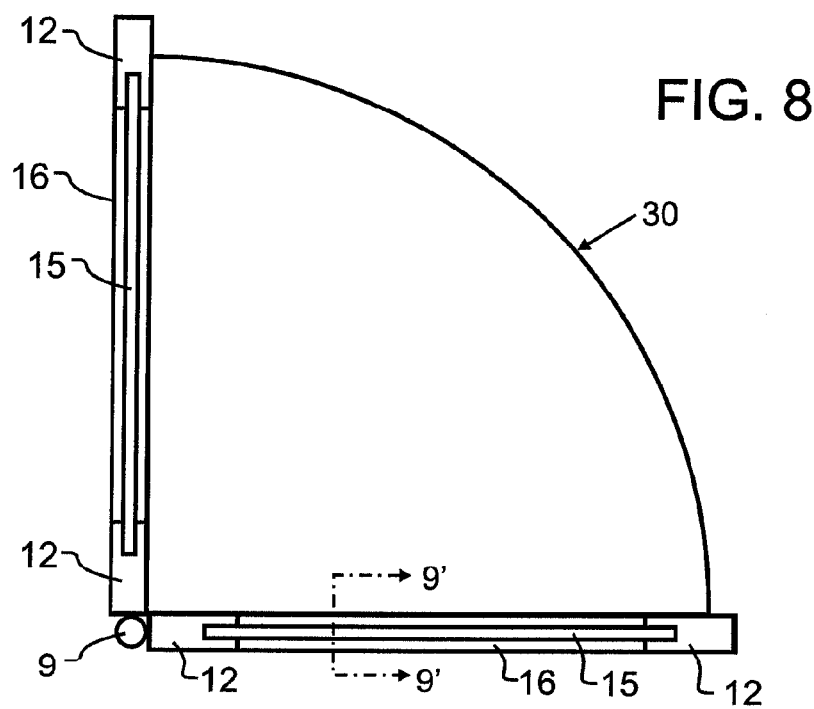

As can be seen in FIGS. 8 and 9, hooks 34 engage with crossbars 14, 16 and/or support bars 18 in such a manner that they engage and anchor into groove 13, 15, or 17. This allows for the preferred embodiment shelf 30 to hold items for display, or needing sunlight, such as a plant or fish tank, with a blank space 22 created using friction fit spacers 20 or with a partition panel using an interchangeable panel 24, 26, 28, as may be desired. In the illustration of FIG. 9, a friction fit spacer 20 is illustrated, though it will be recognized that a panel 24, 26, 28 may also or alternatively be provided. Furthermore, and while not separately illustrated, it will be apparent that a continuously connected (through hinges 9) six, seven or eight frame portable partition system 100 may be used to completely form a circle, using four ninety degree shelves 30. Alternatively, and using the same four ninety degree shelves 30 with only two portable partition systems 100, each of only two frames, an entire circle may also be spanned. With the present design, the shelves do not need to be at the same elevation above the ground, and may instead be at different heights around the full 360 degree circle. Of course, more shelves than the four may also be provided, and at various elevations as well. The shelves 30 in combination with hooks 34 anchor into grooves 13, 15, 17 and thereby help to hold frame members 10 at particular predetermined orientations relative to each other. As already noted herein above, since shelves 30 may be rectangular or a portion of a circle through any suitable arc, the angles between frame members 10 will be determined by the shelves selected.

From these figures and the description, several additional features and options become more apparent. First of all, modular frames 10 may be made from any variety of sufficiently lightweight, durable, and sturdy materials, including resins and plastics, metals, wood, cementitious materials, or even combinations of the above. The specific material used may vary, though special benefits are attainable if several important factors are taken into consideration. First, modular frames 10 should be sufficiently light to enable even a relatively small or frail person to safely move or set up portable partition system 100. Most preferably, modular frames 10 will also be sufficiently durable to withstand repeated set up and adjustment in addition to any forces that may be applied that could tend to tear, fracture, or penetrate the material. Additionally, resistance to abrasion from such contact as would be found during set up and storage would be preferable. Similarly, uprights 18 and crossbars 13, 15, 19 may also be made from any sufficiently sturdy, lightweight, and durable material.

Because all panels 24, 26, 28 are visible on both sides (front and back) of the partition 100, they may have a different decorative or functional finish on either side, increasing the variety of choices for the user. Where individual panels are sufficiently thin, two or more may be inserted within the same space, permitting photographs or other precious objects to be captured between two pieces of acrylic, for exemplary purposes. The interchangeable panels 24, 26, 28 can also be used as wall decor when not being used in combination with the modular frame 10. Several designs have been contemplated for the interchangeable panels 24, 26, 28, including, but not limited to matted prints or photos, screen, wallpaper on hardboard, transparent or translucent, pegboard, dry-erase, chalkboard, magnetic or cork boards, minors, any variety of fabrics, or any variety of laminates, composites, or other designs or materials. They may be decorative, informative or perform any other suitable function. Additionally, the less rigid or flaccid interchangeable panels 28 may be captured using friction fit spacers 20 as described herein above, or through other suitable means, such as through adhesion using Velcro, snaps, sewn-in friction fit spacers 20, or any other such means as known to one skilled in the art of coupling.

There are many possible uses for this system. The user may combine modular frames 10 and insert the friction fit spacers 20 and interchangeable panels 22, 24, 26, 28 to create a folding privacy screen for shared living or working areas, a decorative backdrop, to block sunlight or drafts, to direct foot traffic through interior spaces, or to form free-standing display cases or plant supports or growing supports using shelves 30. When desired, the entire portable partition system 100 may further be enclosed. If such an enclosure were transparent, portable partition system 100 might for exemplary purposes be used to form a small and collapsible green house or plant growth structure. As may be apparent, the flexibility created by the present apparatus is essentially without limit.

Figure 10:
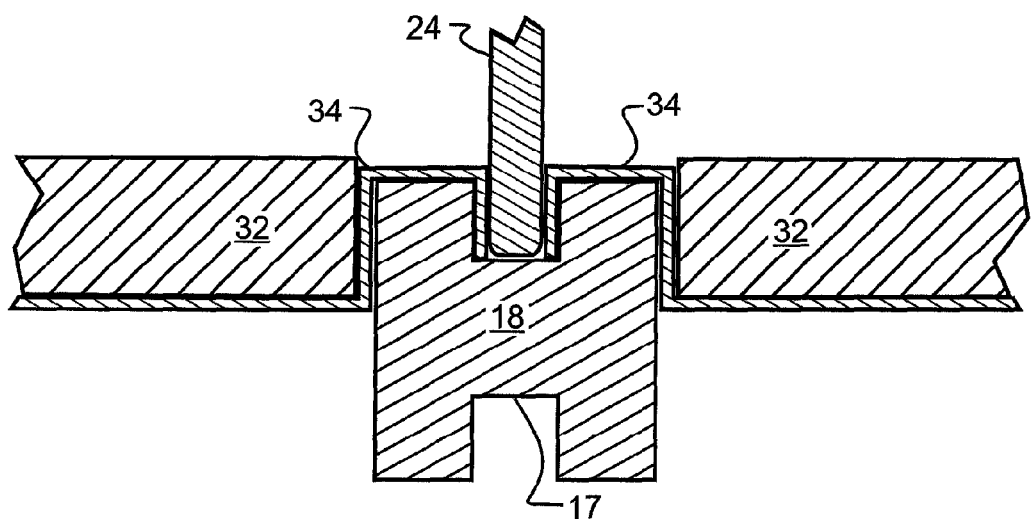
Figure 13:
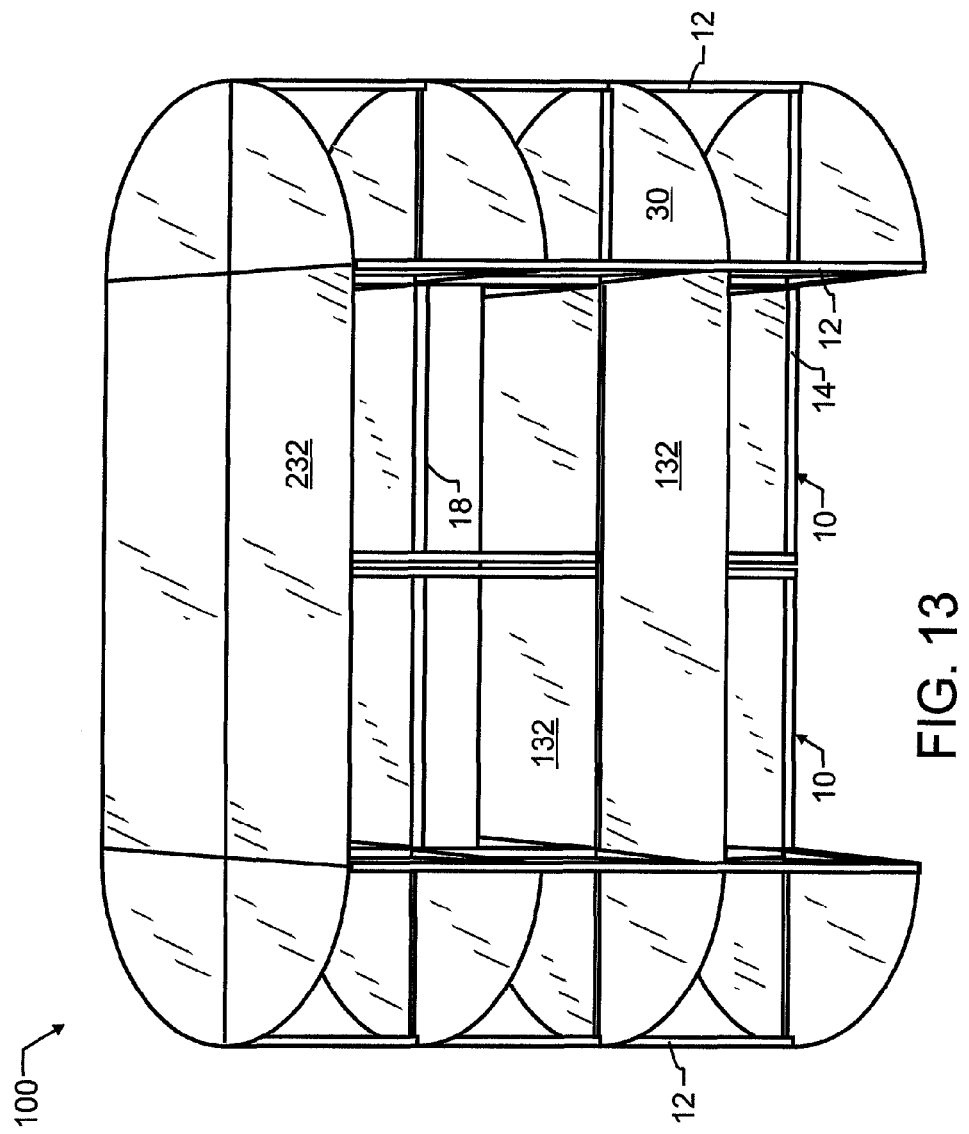
FIG. 13 illustrates one arrangement of frames and shelves, configured to accommodate a desk and shelving, and having user-configured dividers therebetween.

FIG. 10 illustrates a pair of shelving brackets 34 extending in two opposed directions and support two oppositely extending shelves 32, while sharing a common support 18. There is sufficient space between shelving brackets 34 to slide a panel 24 therebetween. As is apparent therein, two brackets 34 can be used on a single support bar 18, each headed opposite of the other, and a panel of any suitable material or decoration may still preferably be inserted therebetween. As illustrated in FIG. 13 herein below, this permits much greater versatility in what types of geometries and aesthetic appearances may be achieved using the present portable partition system 100.

Modular frames 10 illustrated herein may be of any suitable height, width, and thickness, as will be determined for a particular application. Furthermore, different dimensions of frames 10 may be used together, if so desired. The height of shelves, desktops or the like may readily be set by using a suitable length spacer 20 to set that height.

As should also now be apparent, a portable or collapsible structure may readily be expanded in most any direction, and with varying heights if desired. The resulting apparatus will be sturdy and stable when each of the components are used correctly and frames 10 are held at predetermined angles by shelf brackets 34 and shelves 32.

With the present vertical friction fit spacers 20 and grooved uprights 12, the sizes of slide-in panels such as 24, 26 and where they are located within portable partition system 100 may be varied to suit the desires of the assembler. The friction fit spacers 20, as already noted herein above, permit portable partition system 100 to be configured to have some areas open, to resemble a window or doorway if so desired, while other areas may have a panel that is opaque, translucent or transparent, therein. Likewise, grooves 17 may be fabricated in different depths and widths, depending upon the geometry of specific panels 24, 26, 28 and brackets or hooks 34 used.

Figure 11:
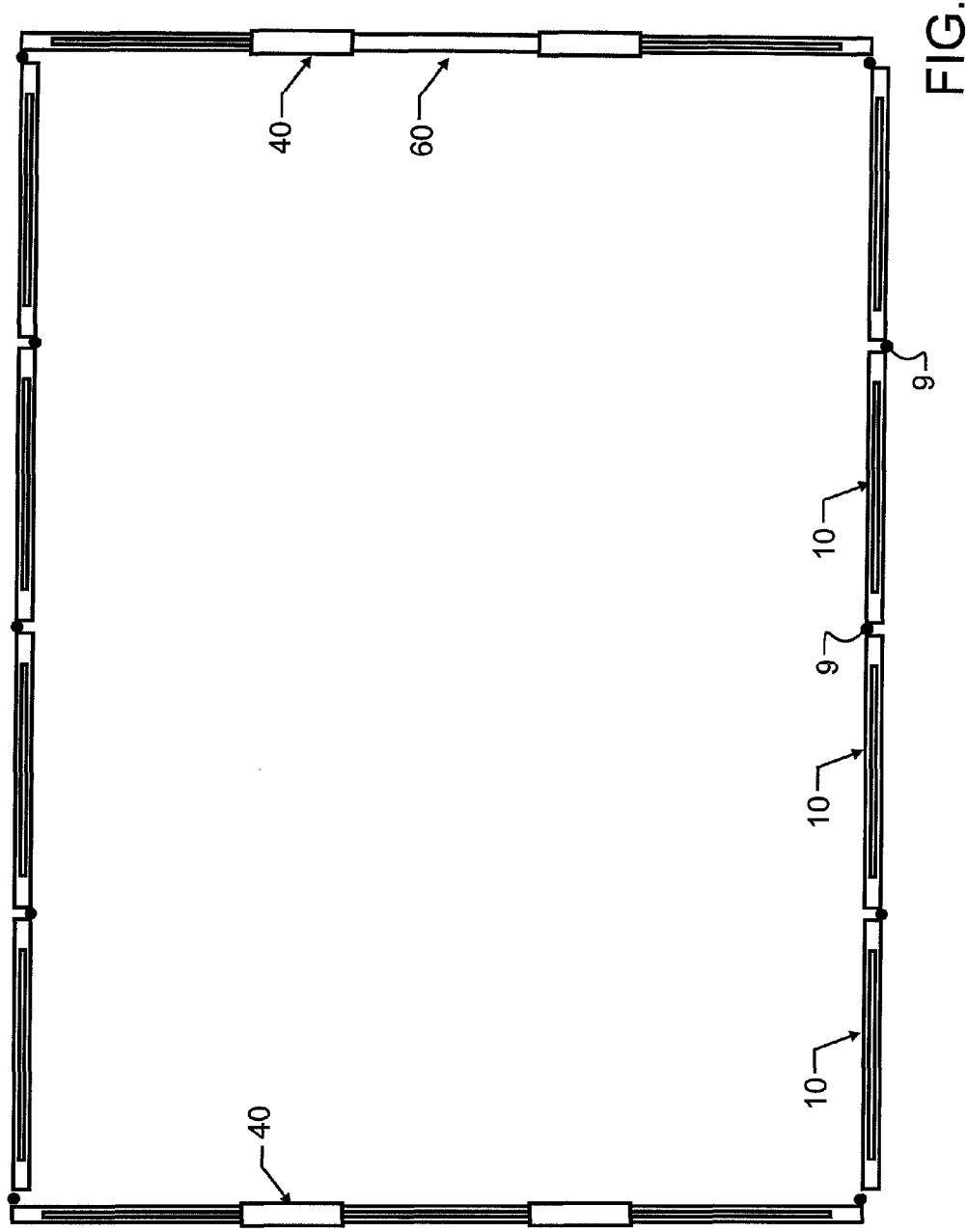
FIG. 11 illustrates 14 connected frames in an open position, permitting all frames to be easily disconnected and to define an indeterminate area, for use as a table base, bed platform, pet enclosure, or other structure which is preferably separable with removable pin hinges or the like, and foldable and collapsible, and which may further contain any variety of panels, spacers and bars.

FIG. 11 illustrates 14 connected frames 10 in an open position, from top view similar to FIG. 2, permitting all frames 10 to be easily connected and to define an indeterminate area, for use as a table base, bed platform, pet enclosure, or other structure which is preferably separable with removable pin hinges or alternative hinges 40, and which may further contain any variety of panels, spacers and bars. Section 60 may be a simple top bar to define a doorway. Noteworthy here is that the height of frames 10 may be selected based upon an intended application, or may even vary from one frame 10 to an adjacent frame 10 as desired by the designer or assembler.

Figure 12:
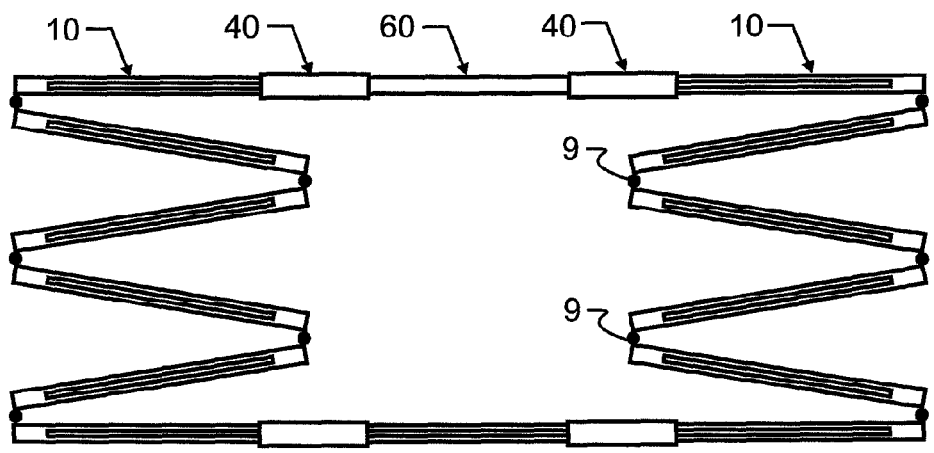
FIG. 12 illustrates a partially collapsed arrangement of the 14 frames of FIG. 11. When fully collapsed, the assembly may be used as a bench or the like. When expanded, an enclosure, support for table or bed, or other applications are understood to be included.

FIG. 12 illustrates a partially collapsed arrangement of the 14 frames of FIG. 11. When fully collapsed, the assembly may be stored or alternatively used as a bench or the like. When expanded, an enclosure, support for table or bed, or other applications are understood to be included.

FIG. 13 illustrates one arrangement of frames and shelves, configured to accommodate a desk and shelving, and having user-configured dividers therebetween. As shown therein, shelves may be included or omitted at different levels, creating different applications. As illustrated, a shelf is omitted from the bottom crossbar 14 and an intermediate level of spacers 18, and the first shelf 132 is therefore elevated from the ground. If selected appropriately, shelf 132 may then be used as a desk for work, study or other purpose, and any variety of screens, pictures or the like may be provided adjacent to a person seated next to shelf 132. Furthermore, shelves may be omitted from the opposite side as well, allowing two facing desks to be defined, similar to opposed study carrels. Further, and where desired, it is contemplated herein to provide elongated sheets of transparent, translucent or opaque plastic that can span parallel with the minor edge of a shelf, and may be positioned immediately adjacent therewith. This plastic sheet can act as an elevated ledge at the edge of the shelf 30, tending to hold items on the shelf 30. The plastic sheet may also or alternatively extend downward below the level of the bottom of the shelf, as desired.

Figure 14:
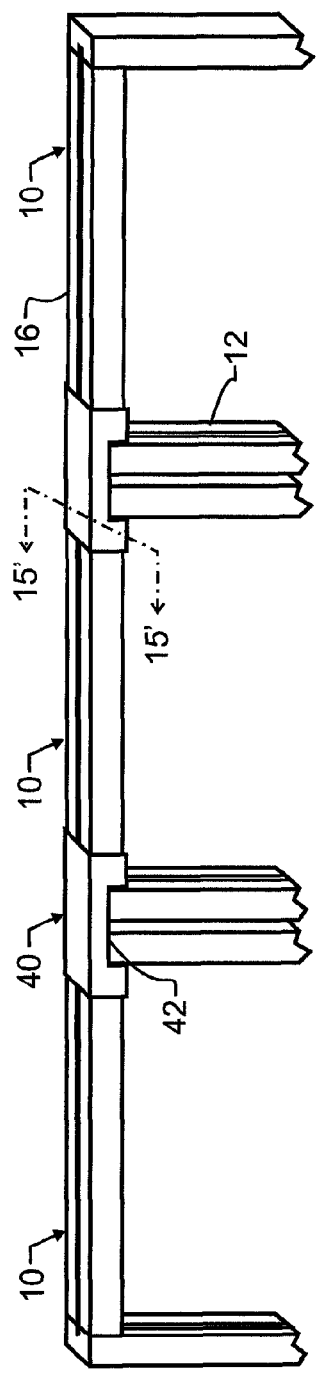
FIG. 14 illustrates a frame locker accessory clip, illustrated in greater detail in FIG. 15, in combination with three frames, illustrating how the clip locks the frames in line.

FIG. 14 illustrates a frame locking accessory clip 40, in combination with three frames 10. Clip 40 will preferably be fabricated from plastic or other suitably strong material that is flexible enough to slip on over the top of two frames to hold them in an open position. This is accomplished by deforming clip 40 to expand to enlarge slit 41 sufficiently to pass entirely around horizontal bar 16. Once slit 41 is sufficiently expanded and clip 40 then pushed about horizontal bar 15, then clip 40 and slit 41 are permitted to return to shape, allowing clip 40 to completely and securely encompass horizontal bar 16. This is illustrated in the sectional view of FIG. 15. Cut-out 42 accommodates or provides space for uprights 12, and ensures that clip 40 stays fixed relative thereto and holds uprights 12 from adjacent frames 10 tightly together. Owing to the nearly complete square tubular geometry of clip 40, clip 40 will urge frames 10 into linear alignment such as shown in FIG. 14.

Figure 16:
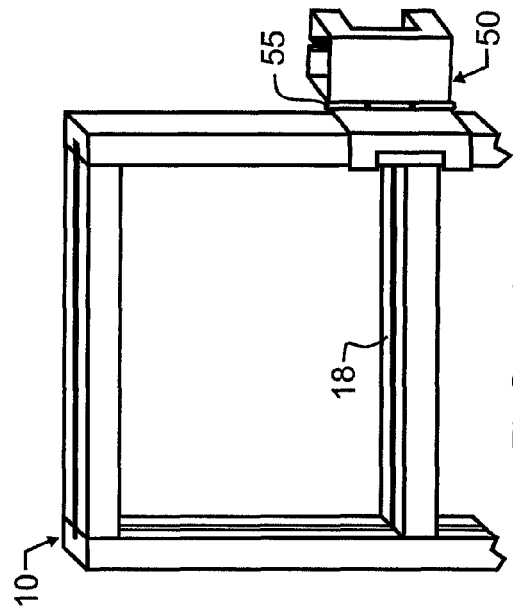
FIG. 16 illustrates two clips, such as illustrated in FIGS. 14 and 15, coupled together through any suitable flexible or pivotal junction to form a clamp-on hinge, and clamped about a single framing member such as was illustrated in FIG. 15.
Figure 15:
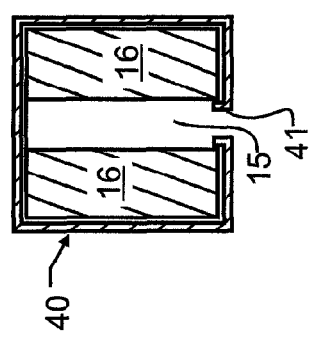
FIG. 15 illustrates the frame locker accessory clip of FIG. 14, comprising a plastic clip that is flexible enough to slip on over the top of two frames to hold them in an open position, from a sectional view taken along line 15' shown in FIG. 14.

Using the clip of FIGS. 14 and 15, frames 10 can be connected and disconnected at any time. The method of connecting them is not limited solely to the use of only conventional "removable pin" hinges. Illustrated in FIG. 16 is a simple "clamp-on" connecting hinge 50 using the features and concepts taught by clip 40. Hinge 50 would ideally be fabricated from plastic or similar materials to allow flexibility when attaching and removing from frames 10. The geometry of hinge 50 comprises two clips such as shown in FIG. 15, but, for exemplary purposes, each clip is connected by a flexible piece such as flexible plastic member 55 attached to and between both pieces. Flexible member 55 may be a simple link, or may be accordion-folded, or even a so-called "living hinge". Clamp-on hinge 50 may then be clamped first about a single framing member 10 as illustrated in FIG. 16, and easily connected to a like second framing member to form a hinge therebetween. Where desired, clips 40 and hinges 50 may additionally be optically transparent or translucent, reducing their visibility for aesthetic benefit.

In a further alternative, metal hinges such as removable pin hinge 9 may be used, but rather than affixing such hinges with screws, nails or other fasteners, hinges 9 may be held in place by a magnet affixed to or embedded in frame 10.

Figure 17:
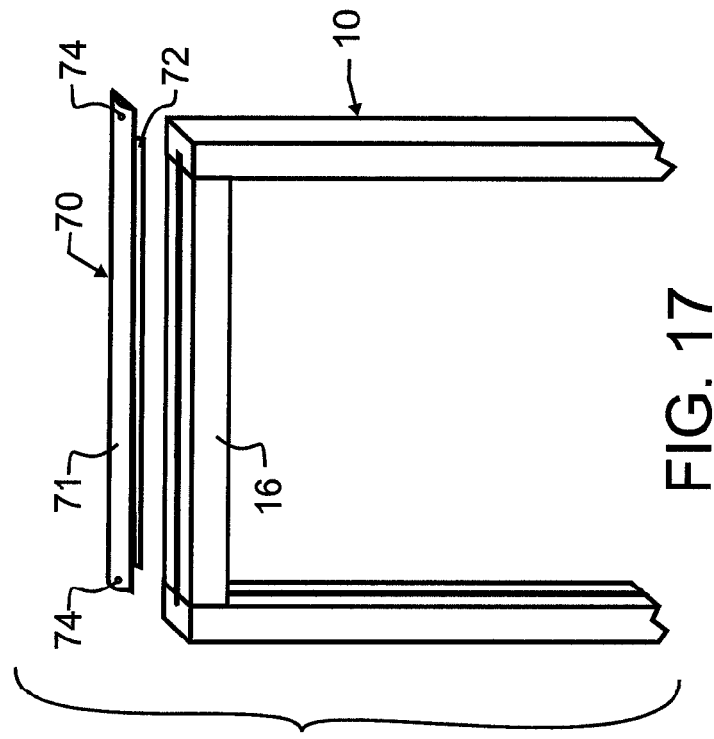
FIG. 17 illustrates a top cap in combination with a frame member top, designed to insert therein to further secure vertical friction fit spacers into the grooves and prevent the spacers from lifting vertically out or tilting inward towards each other.

FIG. 17 illustrates a top cap 70 in combination with a frame member top horizontal bar 16. Top cap 70 is preferably designed with a large cover 71 and a narrower insert blade 72. Insert blade 72 may operatively be inserted into space 15, which simultaneously helps to secure vertical spacers 20 into vertical grooves 13 and also prevents spacers 20 or any shelving hooks or brackets 34 from lifting vertically out or tilting inward towards each other.

Figure 18:
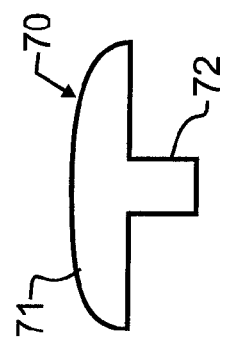
FIGS. 18 and 19 illustrate alternative side views for the top cap of FIG. 17.
Figure 19:
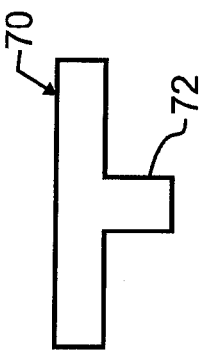

FIGS. 18 and 19 illustrate alternative sectional or side geometries for top cap 70. In FIG. 18, top cap 70 has a domed top 71, which is particularly useful when portable partition system 100 is used in a wet environment, where it will facilitate water shedding. In such an environment, horizontal supporting members 14, 16, 18 may further be provided with vertically extending drainage holes of suitable size and location formed there through to further facilitate better drainage. In the embodiment of FIG. 19, flat top 73 is of a lower profile, and so will protrude vertically less than domed top 71.

Preferably, top cap 70 will be provided with distally located fastener sites, such as screw holes 74, which will permit top cap 70 to be secured directly to uprights 12. While screw holes 74 are illustrated, it is contemplate herein to use any suitable fasteners, and such fasteners may be provided separately from top cap 70 or may be formed integrally therewith, such as the familiar "Christmas tree" plastic plugs that are used to fasten together many parts such as automobile panels and the like. When top cap 70 is secured in place, shelves will be prevented from being accidentally lifted out of openings such as 15 or grooves such as 17.

Decorative interchangeable panels 28 are easily changed by removing fabric panels and replacing them with different less rigid panels 28, or by removing friction fit spacers 20 and less rigid panels 28 and sliding rigid interchangeable panels 24, 26 into the grooves. The slide-in rigid panels 24, 26 and frames can be used to create a work space for a home, office, classroom or dorm room. Panels may be decorative (matted prints or photos, screen, wallpaper on hardboard, acrylic, etc) or functional (pegboard, dry-erase, chalkboard, magnetic or cork). They may be used to display artwork, photos, files, menus, sheet music, schedules, art or craft projects, etc. Pegboard panels may be painted or another decorative finish applied, and used to hang utensils, wall pockets, keys, jewelry, small items of clothing or accessories. The same type of assembly and parts can be configured in different ways, for many uses. Some additional applications are presented herein for exemplary purposes, though it should be clear that these are not limiting in any way. These applications include: connectable desks, compatible with a connectable shelving/storage system such as illustrated in FIG. 13; a low seating platform; workbenches, preferably using pegboard panels; potting tables; displays for retail, school or other venues; retail signage; dorm room desks/shelving/dividers; craft tables with display panels—an embodiment herein illustrates using two thin clear acrylic panels with photos, prints or any other flat item to be displayed sandwiched between the panels so that items are visible from both sides; on a smaller scale, a child's building set with the same but child-proof components, ideally with safe, smaller acrylic panels with item (photos or other pictures or letters, etc) sandwiched between as described above; a "room" with a floating floor above the ground supporting portable partition system 100, the room which may be rectangular or of other shape and which can be made by connecting divider frames, and the "room" can be closed or opened by pushing or pulling the frames together or apart; using the same type of configuration, but with shorter frames, a bench when folded up can pull out to make a bed frame, using rectangular shelves and brackets as stabilizing cross-pieces, or a table, or leave the rectangular shelves and brackets off the top of the structure to make a fold-up/fold-out pet enclosure. Panels can be slid in or out from the opening at the top of each frame to allow the frames to be open or closed (for a "door" or access to the interior when used as a bed frame, table or pet enclosure). When not in use, the frames may be easily folded and stored. The frame and panel partition is decorative, useful, portable and versatile.

Friction-fit spacers are preferably placed in all open grooves to provide maximum stability. Also, while no drawings specifically show a much smaller version, but with the same components, such will be understood to be incorporated herein and might in such instance be used as a type of building set for children.

While the foregoing details what is felt to be the preferred and additional alternative embodiments of the invention, no material limitations to the scope of the claimed invention are intended. The variants that would be possible from a reading of the present disclosure are too many in number for individual listings herein, though they are understood to be included in the present invention. Further, features and design alternatives that would be obvious to one of ordinary skill in the art are considered to be incorporated herein. The scope of the invention is set forth and particularly described in the claims herein below.

We claim:

1. A portable partition system which is readily adaptable in appearance and function, comprising:
    a first longitudinally extensive upright having a longitudinally extensive groove therein;
    a second longitudinally extensive upright having a longitudinally extensive groove therein, said first and second uprights spaced from each other and oriented with said second upright groove facing said first upright groove and defining a panel space therebetween into which a decorative panel may be operatively inserted;
    a first spacer operatively longitudinally incompressible and at least partially inserted within and manually removable from said first upright groove wherein said first spacer has a higher density exterior, lower density core, and compresses within and forms a friction fit with said first upright groove;
    a second spacer operatively longitudinally incompressible and at least partially inserted within and manually removable from said second upright groove; and
    a support bar spanning from said first upright to said second upright and manually removable therefrom, supported vertically by said first and second spacers.

2. The portable partition system which is readily adaptable in appearance and function of claim 1, further comprising:
    a first horizontal bar coupling a top of said first longitudinally extensive upright with a top of said second longitudinally extensive upright;
    a third longitudinally extensive upright having a longitudinally extensive groove therein;
    a fourth longitudinally extensive upright having a longitudinally extensive groove therein, said third and fourth uprights spaced from each other and oriented with said fourth upright groove facing said third upright groove and defining a panel space therebetween into which a decorative panel may be operatively inserted;
    a third spacer operatively longitudinally incompressible and at least partially inserted within and manually removable from said third upright groove;
    a fourth spacer operatively longitudinally incompressible and at least partially inserted within and manually removable from said fourth upright groove;
    a support bar spanning from said third upright to said fourth upright and manually removable therefrom, supported vertically by said third and fourth spacers;
    a second horizontal bar coupling a top of said third longitudinally extensive upright with a top of said fourth longitudinally extensive upright; and
    a frame locking clip of substantially complete square tubular geometry having a slit therein extending completely from a first longitudinal end to a second longitudinal end, and flexible to deform and operatively slip on over and then return to non-deformed shape securely encompassing said first and second horizontal bars to urge frames into linear alignment, thereby coupling said third upright to said first upright.

3. The portable partition system which is readily adaptable in appearance and function of claim 1, wherein said support bar longitudinally extends from said first upright to said second upright, and further comprises:
    at least one longitudinally extensive support bar groove that cooperates with said first upright groove and said second upright groove;

a friction-fit spacer within said at least one longitudinally extensive support bar groove; and a shelf engaging and supported within said at least one longitudinally extensive support bar groove and frictionally retained by said friction-fit spacer therein.

4. The portable partition system which is readily adaptable in appearance and function of claim 1, wherein said support bar longitudinally extends from said first upright to said second upright, and further comprises at least one longitudinally extensive groove that cooperates with said first upright groove and said second upright groove to receive a rigid generally rectangular panel therein, and further comprising:

a third longitudinally extensive upright having a longitudinally extensive groove therein;

a fourth longitudinally extensive upright having a longitudinally extensive groove therein, said third and fourth uprights spaced from each other and oriented with said fourth upright groove facing said third upright groove and defining a panel space therebetween into which a decorative panel may be operatively inserted;

a third spacer at least partially inserted within and manually removable from said third upright groove;

a fourth spacer at least partially inserted within and manually removable from said fourth upright groove;

a second support bar longitudinally extending from said third upright to said fourth upright and manually removable therefrom, supported vertically by said third and fourth spacers, and having at least one longitudinally extensive groove that cooperates with said third upright groove and said fourth upright groove to receive a rigid generally rectangular panel therein;

a hinge pivotally coupling said third upright to said first upright; and a shelf terminating at each opposed longitudinal end with a hook, each one of said hooks engaging and supported within said first and second support bar grooves, at least one of said support bar grooves further supporting an edge of a rigid generally rectangular panel therein.

5. The portable partition system which is readily adaptable in appearance and function of claim 4, further comprising a plurality of uprights, shelves, and spacers forming a full circular circumference, the angular relationship between adjacent uprights fixed by said shelves.

6. The portable partition system of claim 4, further comprising a second shelf terminating in a hook, said second shelf hook engaging and supported within said at least one of said support bar grooves with said first shelf hook and said edge of said rigid generally rectangular panel.

7. The portable partition system of claim 1, wherein said first spacer fits substantially entirely within said first upright groove.

8. The portable partition system of claim 1, wherein said first spacer further comprises a flocked surface.

9. The portable partition system of claim 1, wherein said first spacer further comprises a frangible body that is operatively manually snapped to length.

10. The portable partition system of claim 9, wherein said first spacer further comprises at least one score to facilitate said operative manually snapping to length.

11. A partition system, comprising:

a first longitudinally extensive upright having a longitudinally extensive groove therein;

a second longitudinally extensive upright having a longitudinally extensive groove therein, said first and second uprights spaced from each other and oriented with said second upright groove facing said first upright groove and defining a panel space therebetween into which a decorative panel may be operatively inserted;

a first spacer at least partially inserted within and manually removable from said first upright groove;

a second spacer at least partially inserted within and manually removable from said second upright groove;

a first support bar spanning from said first upright to said second upright and manually removable therefrom, supported vertically by said first and second spacers, and having at least one longitudinally extensive groove that cooperates with said first upright groove and said second upright groove to receive a rigid generally rectangular panel therein;

a third longitudinally extensive upright having a longitudinally extensive groove therein;

a fourth longitudinally extensive upright having a longitudinally extensive groove therein, said third and fourth uprights spaced from each other and oriented with said fourth upright groove facing said third upright groove and defining a panel space therebetween into which a decorative panel may be operatively inserted;

a third spacer at least partially inserted within and manually removable from said third upright groove;

a fourth spacer at least partially inserted within and manually removable from said fourth upright groove;

a second support bar longitudinally extending from said third upright to said fourth upright and manually removable therefrom, supported vertically by said third and fourth spacers, and having at least one longitudinally extensive groove that cooperates with said third upright groove and said fourth upright groove to receive a rigid generally rectangular panel therein;

a hinge pivotally coupling said third upright to said first upright;

a first shelf engaging and supported within said first and second support bar grooves and a second shelf engaging and supported within said first support bar groove; and a panel supported on one edge within said first support bar groove.

12. The partition system of claim 11, wherein said first spacer has a generally tubular body and a compressible core, and is operatively longitudinally incompressible and radially deformable, and forms a friction fit with said first upright groove.

13. The partition system of claim 11, wherein said first spacer further comprises a flocked surface.

14. The partition system of claim 11, wherein said wherein said first spacer further comprises a frangible body that is operatively manually snapped to length.

15. The partition system of claim 14, wherein said first spacer further comprises at least one score to facilitate said operative manually snapping to length.

16. The partition system of claim 11, further comprising:

a first horizontal bar coupling a top of said first longitudinally extensive upright with a top of said second longitudinally extensive upright;

a second horizontal bar coupling a top of said third longitudinally extensive upright with a top of said fourth longitudinally extensive upright; and a frame locking clip of substantially complete square tubular geometry having a slit therein extending completely from a first longitudinal end to a second longitudinal end, and flexible to deform and operatively slip on over and then return to non-deformed shape securely encompassing said first and second horizontal bars to urge frames into linear alignment, thereby coupling said third upright to said first upright.

17. A partition system of claim 16, wherein said frame locking clip further comprises a transverse opening in said square tubular geometry through which said first upright and said third upright pass, said transverse opening holding said first and third uprights tightly together.

18. A portable partition system which is readily adaptable in appearance and function, comprising:
- a first longitudinally extensive upright having a longitudinally extensive groove therein;
- a second longitudinally extensive upright having a longitudinally extensive groove therein, said first and second uprights spaced from each other and oriented with said second upright groove facing said first upright groove and defining a panel space therebetween into which a decorative panel may be operatively inserted;
- a first horizontal bar coupling a top of said first longitudinally extensive upright with a top of said second longitudinally extensive upright and thereby defining a first frame;
- a third longitudinally extensive upright having a longitudinally extensive groove therein;
- a fourth longitudinally extensive upright having a longitudinally extensive groove therein, said third and fourth uprights spaced from each other and oriented with said fourth upright groove facing said third upright groove and defining a panel space therebetween into which a decorative panel may be operatively inserted;
- a second horizontal bar coupling a top of said third longitudinally extensive upright with a top of said fourth longitudinally extensive upright and thereby defining a second frame; and
- a frame locking clip having first, second, third and fourth faces defining a substantially complete square tubular geometry, said first face having a slit therein extending completely from a first longitudinal end to a second longitudinal end, and further having a transverse notch partially removing said first, second and fourth faces, said frame locking clip flexible to deform and operatively slip on over and then return to non-deformed shape while said first and third uprights pass through said first face at said transverse notch, said frame locking clip thereby securely encompassing said first and second horizontal bars to urge said first and second frames into linear alignment and thereby operatively coupling said third upright to said first upright.

\* \* \* \* \*